US010981650B2

(12) United States Patent
Fink et al.

(10) Patent No.: US 10,981,650 B2
(45) Date of Patent: Apr. 20, 2021

(54) MULTIROTOR JOINED-WING AIRCRAFT WITH VTOL CAPABILITIES

(71) Applicant: AIRBUS HELICOPTERS DEUTSCHLAND GMBH, Donauworth (DE)

(72) Inventors: Axel Fink, Donauworth (DE); Uwe Kiesewetter, Rain am Lech (DE); Klaus Kicker, Hilgertshausen-Tandern (DE)

(73) Assignee: AIRBUS HELICOPTERS DEUTSCHLAND GMBH, Donauworth (DE)

(*) Notice: Subject to any disclaimer, the term of this patent is extended or adjusted under 35 U.S.C. 154(b) by 2 days.

(21) Appl. No.: 16/702,733

(22) Filed: Dec. 4, 2019

(65) Prior Publication Data

US 2020/0269980 A1 Aug. 27, 2020

(30) Foreign Application Priority Data

Feb. 27, 2019 (EP) .................................. 19400005

(51) Int. Cl.
| | | |
|---|---|---|
| *B64C 39/06* | (2006.01) | |
| *B64C 1/24* | (2006.01) | |
| *B64C 3/16* | (2006.01) | |
| *B64C 5/06* | (2006.01) | |
| *B64C 11/00* | (2006.01) | |

(Continued)

(52) U.S. Cl.
CPC .............. *B64C 39/068* (2013.01); *B64C 1/24* (2013.01); *B64C 3/16* (2013.01); *B64C 5/06* (2013.01); *B64C 11/007* (2013.01); *B64C 29/0025* (2013.01); *B64C 39/04* (2013.01)

(58) Field of Classification Search
CPC ....... B64C 39/08; B64C 39/068; B64C 27/26; B64C 2201/108
See application file for complete search history.

(56) References Cited

U.S. PATENT DOCUMENTS

| 3,089,666 A | 5/1963 | Quenzler |
| 3,262,657 A | 7/1966 | Leif |

(Continued)

FOREIGN PATENT DOCUMENTS

| CN | 201306711 Y | 9/2009 |
| CN | 202728571 U | 2/2013 |

(Continued)

OTHER PUBLICATIONS

European Search Report for European Application No. EP 19400005. 5, Completed by the European Patent Office, dated Aug. 19, 2019, 5 pages.

*Primary Examiner* — Brian M O'Hara
(74) *Attorney, Agent, or Firm* — Brooks Kushman P.C.

(57) ABSTRACT

A multirotor aircraft that is adapted for vertical take-off and landing. The multirotor aircraft comprises a fuselage, a tail boom that is provided with a vertical fin, a thrust producing units assembly that is provided for producing thrust in operation, at least one lower wing which comprises a lower wing inboard section that is connected to the fuselage and a lower wing outboard section that forms a lower wing tip, and at least one upper wing which is connected to the vertical fin and which forms an upper wing tip. The at least one upper wing is joined to the at least one lower wing in a joined-wing configuration.

20 Claims, 6 Drawing Sheets

(51) Int. Cl.
  *B64C 29/00*    (2006.01)
  *B64C 39/04*    (2006.01)

(56) References Cited

U.S. PATENT DOCUMENTS

| | | | |
|---|---|---|---|
| 5,899,409 A | 5/1999 | Frediani | |
| 6,568,630 B2 | 5/2003 | Yoeli | |
| 7,857,253 B2 | 12/2010 | Yoeli | |
| 7,946,528 B2 | 5/2011 | Yoeli | |
| D678,169 S | 3/2013 | Kennelly et al. | |
| 8,393,564 B2 | 3/2013 | Kroo | |
| 8,733,690 B2 | 5/2014 | Bevirt et al. | |
| 9,321,526 B2 | 4/2016 | Fink et al. | |
| 9,694,911 B2 * | 7/2017 | Bevirt | B64C 39/068 |
| 9,944,386 B1 | 4/2018 | Reichert et al. | |
| 9,975,631 B1 | 5/2018 | McLaren et al. | |
| 10,086,931 B2 | 10/2018 | Reichert et al. | |
| 2007/0034738 A1 | 2/2007 | Sanders, Jr. et al. | |
| 2013/0118856 A1 | 5/2013 | Long | |
| 2015/0127209 A1 | 5/2015 | Al-Garni et al. | |
| 2015/0266571 A1 | 9/2015 | Bevirt et al. | |
| 2015/0314865 A1 | 11/2015 | Bermond et al. | |
| 2016/0207625 A1 | 7/2016 | Judas et al. | |
| 2017/0369162 A1 | 12/2017 | Alzahrani | |
| 2018/0290736 A1 * | 10/2018 | Mikic | B64C 3/32 |

FOREIGN PATENT DOCUMENTS

| | | |
|---|---|---|
| CN | 104176250 A | 12/2014 |
| CN | 105151292 A | 12/2015 |
| CN | 105270620 A | 1/2016 |
| CN | 105346719 A | 2/2016 |
| CN | 205098474 U | 3/2016 |
| CN | 105564633 A | 5/2016 |
| CN | 205707349 U | 11/2016 |
| CN | 206012959 U | 3/2017 |
| CN | 206218213 U | 6/2017 |
| CN | 206427269 U | 8/2017 |
| CN | 107539472 A | 1/2018 |
| CN | 107600405 A | 1/2018 |
| DE | 69430198 T2 | 7/2003 |
| DE | 102005022706 A1 | 11/2006 |
| DE | 102013108207 A1 | 2/2015 |
| EP | 2234883 A2 | 10/2010 |
| EP | 2418148 A2 | 2/2012 |
| EP | 2551190 A1 | 1/2013 |
| EP | 2551193 A1 | 1/2013 |
| EP | 2551198 A1 | 1/2013 |
| EP | 2571762 A1 | 3/2013 |
| EP | 2985220 A1 | 2/2016 |
| EP | 3333072 A1 | 6/2018 |
| EP | 3366582 A1 | 8/2018 |
| GB | 905911 A | 9/1962 |
| KR | 20090101413 A | 9/2009 |
| KR | 101451646 B1 | 10/2014 |
| RU | 180474 U1 | 6/2018 |
| WO | 2009077968 A2 | 6/2009 |
| WO | 2011144696 A1 | 11/2011 |
| WO | 2013126117 A1 | 8/2013 |
| WO | 2015019255 A1 | 2/2015 |
| WO | 2015028627 A1 | 3/2015 |
| WO | 2015143093 A1 | 9/2015 |
| WO | 2016004852 A1 | 1/2016 |
| WO | 2017021918 A1 | 2/2017 |
| WO | 2017155348 A1 | 9/2017 |
| WO | 2018075414 A1 | 4/2018 |
| WO | 2018078388 A1 | 5/2018 |
| WO | 2018081734 A1 | 5/2018 |
| WO | WO-2019211875 A1 * | 11/2019 ............... B64F 1/10 |

* cited by examiner

MULTIROTOR JOINED-WING AIRCRAFT WITH VTOL CAPABILITIES

CROSS-REFERENCE TO RELATED APPLICATIONS

This application claims priority to French patent application No. EP 19400005.5 filed on Feb. 27, 2019, the disclosure of which is incorporated in its entirety by reference herein.

BACKGROUND OF THE INVENTION

(1) Field of the Invention

The invention is related to a multirotor aircraft that is adapted for vertical take-off and landing, comprising a fuselage, a tail boom, a thrust producing units assembly that is provided for producing thrust in operation, at least one lower wing, and at least one upper wing, wherein the at least one upper wing is joined to the at least one lower wing in a joined-wing configuration.

(2) Description of Related Art

Various conventional multirotor aircrafts that are adapted for vertical take-off and landing (VTOL) and which are hereinafter referred to as "VTOL multirotor aircrafts" are known, e. g. from the documents EP 2 551 190 A1, EP 2 551 193 A1, BP 2 551 198 A1, EP 2 234 883 A1, EP 2 571 762 A1, EP 2 985 220 A1, WO 2015/028627 A1, WO 2016/004852 A1, WO 2017/021918 A1, WO 2017/155348 A1, WO 2018/078388 A1, WO2015028627, WO2018081734, U.S. Pat. Nos. 3,262,657 A, 7,857,253 B2, 7,946,528 B2, US 2007/0034738 A1, US 2017/0369162 A1, GB 905 911 A, CN 104176250 A, CN 105151292 A, CN 105270620 A, CN 105346719 A, CN 107539472 A, CN 107600405 A, CN 201306711 U, CN 202728571 U, CN 205098474 U, CN 205707349 U, CN 206012959 U, CN 206427269 U, CN105564633 and KR 20090101413 A. Other VTOL multirotor aircrafts are also known from the state of the art, such as e. g. the Boeing CH-47 tandem rotor helicopter, the Bell XV-3 tilt rotor aircraft, the Bell XV-22 quad tilt with ducted rotors, as well as so-called drones and, more particularly, so-called quad drones, such as e. g. described in the documents US 2015/0127209 A1, DE 10 2005 022 706 A1 and KR 101 451 646 B1. Furthermore, VTOL multirotor aircraft studies and prototypes also exist, such as e. g. the crossover-mobility vehicle Pop.Up Next from Airbus, Italdesign and Audi, the autonomous aerial vehicle Ehang 184 from Bejing Yi-Hang Creation Science & Technology Co. Ltd., the skyflyer SF MK II from Skyflyer Technology GmbH, the Quadcruiser from Airbus Group.

Each one of these VTOL multirotor aircrafts is equipped with a thrust producing units assembly having less than eight thrust producing units that are provided for producing thrust in a predetermined thrust direction during operation of the multirotor aircraft. However, studies and prototypes of VTOL multirotor aircrafts that are equipped with eight or more thrust producing units also exist, such as e. g. the multicopter Volocopter 2X from e-Volo GmbH, the Cora from Kitty Hawk Corp., the eVTOL Vahana from Airbus A3, and the Joby S2 VTOL from Joby Aviation. Still other VTOL multirotor aircrafts with eight or more thrust producing units are described in the documents WO 2013/126117 A1, WO 2015/143093 A2, DE 10 2013 108 207 A1, U.S. Pat. Nos. 6,568,630 B2, D678,169 S, 8,393,564 B2, 8,733, 690 B2, US 2013/0118856 A1, CN 206218213 U, U.S. Pat. No. 9,944,386 B1, 10,086,931 B2, 9,975,631 B1, EP 3 366 582 A1, EP 3 333 072 A1, WO 2018/075414 A1, U.S. Pat. No. 3,089,666 A, WO 2018/075414 A1, and RU 180 474 U1.

More generally, mainly three different types of VTOL multirotor aircrafts are currently developed. A first VIOL multirotor aircraft type exhibits a design that may be referred to as a "conventional design". According to this conventional design, the first VTOL multirotor aircraft type is usually wingless and only equipped with thrust producing units which are rigidly attached to a respective airframe and essentially adapted for hover, but which are nevertheless also used to provide thrust in cruise forward flight operation. An example for this first VTOL multirotor aircraft type is the Volocopter 2X from e-Volo GmbH.

A second VTOL multirotor aircraft type exhibits a design that may be referred to as a "convertible design". According to this convertible design, the second VTOL multirotor aircraft type is equipped with tiltable thrust producing units which are tiltable between a first position, wherein they only produce thrust for hover, and a second position, wherein they only produce thrust for cruise operation. The second VTOL multirotor aircraft type is usually implemented in fixed-wing or tiltable-wings layout. An example for this second VTOL multirotor aircraft type in tiltable-wings layout is the eVTOL Vahana from Airbus A3. Other VTOL multirotor aircrafts with tiltable thrust producing units are e. g. described in the documents U.S. Pat. Nos. 10,086,931 B2 and 9,975,631 B1.

A third VTOL multirotor aircraft type exhibits a design that may be referred to as a "compound design". According to this compound design, the third VTOL multirotor aircraft type is equipped with rigidly mounted thrust producing units which are provided to produce mainly lift and which are essentially adapted for hover, and with rigidly mounted thrust producing units which are provided to produce additional forward thrust for propulsion in forward flight. The third VTOL multirotor aircraft type is usually implemented in wingless or fixed-wing layout. An example for this third VTOL multirotor aircraft type in fixed-wing layout is the Cora from Kitty Hawk Corp.

More specifically, VTOL multirotor aircrafts in compound design with fixed-wing layout advantageously combine lifting surfaces, i. e. wings, with a plurality of thrust producing units, both providing diverse lift/thrust compound characteristics. The wings are provided for generating lift during forward flight and, thus, allow for a reduction of a respective power consumption during flight. This results in a beneficial range extension for a given VTOL multirotor aircraft and improved performance characteristics of respective motors and rotors of the thrust producing units. In fact, the economic use of an available power resource for a VTOL multirotor aircraft is currently one of the major topics that impacts a general suitability of electro-mobility during flight.

However, use of a plurality of thrust producing units that essentially produce lift on a given wing represents in any case a challenge for controllability and stability of the VTOL multirotor aircraft, even more in case of inoperability of one or more associated rotors, for the aerodynamic and structural efficiency of the aircraft and the architectural arrangement of a respective cabin, thrust producing units that generate forward thrust, lifting surfaces and batteries with respect to safety and operational requirements. This challenge consists on one hand in arranging the plurality of thrust producing units that essentially produce lift on the wing with respect to the fuselage of a given VTOL multirotor aircraft such that negative aerodynamic interactions can be avoided. On the other hand, it is imperative to ensure a safe regular or emergency operation of the aircraft, to allow for easy access to the systems and to reach excellent weight and thus mission efficiencies. By way of example, negative aerodynamic interactions of wings and thrust producing units that essentially produce lift are e. g. associated on the one hand with overlaps during hover flight, as well as wake interferences during forward flight on the other hand, hence further emphasizing a need to increase overall dimensions of the given VTOL multirotor aircraft and its corresponding total footprint.

In order to overcome at least some of the above-described drawbacks, a new concept of VTOL multirotor aircrafts is based on braced wing configurations, i. e. VTOL multirotor aircrafts with so-called box-wing or joined-wing configurations. Generally, such box-wing or joined-wing configurations are provided in the form of a bi-plane wing structure with two main wing planes. In the box-wing configuration respective upper and lower wings are joined together to form a loop-shaped closed wing without defining conventional wing tips, while in the joined-wing configuration the respective upper and lower wings are respectively joined to each other at associated wing tips.

Exemplary VTOL multirotor aircrafts with box-wing or joined-wing configurations are described in the documents DE 694 30 198 T2, EP 2 418 148 A2, and U.S. Pat. No. 9,321,526 B2. These documents respectively describe a VTOL multirotor aircraft with a stiff and efficient box-wing or joined-wing configuration that allows for a suppression of additional lifting surfaces or an efficient integration of thrust producing units and landing gears. The respective box-wing or joined-wing configurations exhibit an arrangement of a pair of interconnected main wings at each side of a given VTOL multirotor aircraft. One of the main wings is swept forward and the other one is swept backward.

Other exemplary VTOL multirotor aircrafts with box-wing or joined-wing configurations are described in the documents WO 2015/019255 A1 and US 2015/266571 A1. The document WO 2015/019255 A1 describes an aircraft comprising a joined-wing configuration, wherein the thrust producing units are integrated into the wings. The document US 2015/266571 A1 describes an aerial vehicle having a bow-wing configuration and being adapted for vertical take-off and landing using a set of wing-mounted rotors and a set of tail-mounted rotors. More specifically, this aerial vehicle is adapted to vertically take-off with the rotors in a vertical take-off configuration and then transitions to a horizontal flight path rotating the rotors into a forward flight configuration. The aerial vehicle uses different configurations of its wing-mounted rotors to reduce drag in all flight modes.

BRIEF SUMMARY OF THE INVENTION

In any case, a major drawback of conventional VTOL multirotor aircrafts consists in a lack of safe boarding zones which allow for a safe and free access, for boarding or for emergency exiting, to a respective passenger cabin of a given VTOL multirotor aircraft without exposition to adjacently arranged thrust producing units that essentially produce lift. Furthermore, in conventional VTOL multirotor aircrafts there are generally discrepancies between spread lift, as a result of a low-interactive multirotor arrangement, and centralized mass, which causes larger load levels on a respective aircraft structure and consequently reductions of the structural weight efficiency. Moreover, large overhead masses are usually created when arranging lifting surfaces such as wings and/or thrust producing units that essentially produce lift ahead of the fuselage, which results in a need of strong frames within the fuselage to cope with safety requirements in emergency landing or crash conditions, hence resulting in additional largely loaded structures and to an associated decrease of structural efficiency. In addition, lift or forward thrust producing units are often arranged in such a way that their respective rotor discs are impacting the aircraft's cabin, which leads to serious safety risks in blade loss scenarios, hence further requiring protection means for the passengers and further penalties in weight efficiency. Finally, many conventional VTOL multirotor aircrafts use undesirable battery locations close to the passengers within the central fuselage, i. e. behind, below or aside the cabin, which represents a serious safety penalty in case of sudden inflammation of the batteries during flight or after crash. It is, therefore, an object of the present invention to provide a new multirotor aircraft that is adapted for vertical take-off and landing and that enables safe operation, in particular by providing freely and securely accessible boarding zones to passengers. The new multirotor aircraft should preferably be provided with a braced-wing configuration that overcomes the above-described drawbacks and that exhibits an improved architectural arrangement of respective wings in combination with an improved thrust producing units distribution to achieve an improved structural weight efficiency whilst ensuring improved safety characteristics for boarding and emergency landings.

This object is solved by a multirotor aircraft that is adapted for vertical take-off and landing comprising the features of claim 1. More specifically, according to the present invention a multirotor aircraft that is adapted for vertical take-off and landing comprises a fuselage, a tail boom that is provided with a vertical fin, a thrust producing units assembly that is provided for producing thrust in operation, at least one lower wing which comprises a lower wing inboard section that is connected to the fuselage and a lower wing outboard section that forms a lower wing tip, and at least one upper wing which is connected to the vertical fin and which forms an upper wing tip. The at least one upper wing is joined to the at least one lower wing in a joined-wing configuration. A first thrust producing unit of the thrust producing units assembly is non-tiltably mounted to the at least one upper wing and provided for generating lift at least during vertical taking-off and landing, the first thrust producing unit being arranged near a leading edge of the at least one upper wing. A second thrust producing unit of the thrust producing units assembly is non-tiltably mounted to the at least one lower wing and provided for generating lift at least during vertical taking-off and landing, the second thrust producing unit being arranged near a trailing edge of the at least one lower wing.

Preferably, the fuselage of the VTOL multirotor aircraft according to the present invention embodies at least a cabin and is adapted for transportation of passengers. At each side of the fuselage, a joined wing may be provided. In other words, preferably a first joined wing is arranged at the starboard side of the VTOL multirotor aircraft, and a second joined wing is arranged at its portside. Each joined wing is preferably composed of one lower, non-tiltable and fixedly-mounted wing, and one upper, non-tiltable and fixedly-mounted wing. In the region of a leading edge of the lower wing, a suitable boarding area for passengers may be located, preferably close to a front region of the VTOL multirotor aircraft.

Advantageously, the upper wing and the lower wing are at least interconnected by means of an intermediate pylon. One axial end of the intermediate pylon is preferentially fixedly mounted to the wing tip of the upper wing. The other axial end of the intermediate pylon is preferentially fixedly mounted to an outboard section of the lower wing at a predetermined wing transition region. The lower wing may extend spanwise beyond this predetermined wing transition region. The intermediate pylon may extend essentially vertically with respect to an upper surface of the lower wing, to which it is connected.

Preferably, the lower wing exhibits a positive sweep angle. In other words, the lower wing is swept rearward so that the wing tip of the lower wing is located aft of a respective inboard section of the lower wing. In contrast, the upper wing preferably exhibits a negative sweep angle. In other words, the upper wing is swept forward so that the wing tip of the upper wing is located ahead of a respective inboard section of the upper wing.

The inboard section of the lower wing may be mounted to a front portion of the fuselage, i. e. of the VTOL multirotor aircraft. Preferably, the inboard section of the lower wing extends below the cabin of the VTOL multirotor aircraft.

Moreover, the inboard section of the lower wing is preferentially extending in parallel to a horizontal reference plane, whereas a respective outboard section of the lower wing preferably exhibits a positive dihedral angle. In other words, the outboard section of the lower wing is upwardly inclined with respect to the horizontal plane, i. e. with respect to the inboard section of the lower wing, such that the wing tip of the lower wing is preferentially located at a larger height than the inboard section of the lower wing with respect to the horizontal plane. The inboard section of the lower wing preferably transits into the outboard section of the lower wing at an associated wing transition region.

Advantageously, the inventive VTOL multirotor aircraft comprises a plurality of electrically driven thrust producing units that form the thrust producing units assembly. A part of the thrust producing units may be dedicated to provide purely lift in operation, while another part may be dedicated to provide additional forward thrust in operation.

Preferably, each one of the joined wings comprises at least three thrust producing units of the thrust producing units assembly: one outboard upper wing thrust producing unit provided at the outboard section of the upper wing, one outboard lower wing thrust producing unit provided at the outboard section of the lower wing, and one inboard lower wing thrust producing unit provided at the inboard section of the lower wing. The outboard upper wing thrust producing unit may be supported by a first wing pod which is mounted to the wing tip of the upper wing. This first wing pod preferably extends in the direction of a leading edge of the upper wing such that the outboard upper wing thrust producing unit is arranged near the leading edge of the upper wing. The outboard lower wing thrust producing unit may be supported by a second wing pod which is mounted to the wing tip of the lower wing. This second wing pod preferably extends in the direction of a trailing edge of the lower wing such that the outboard lower wing thrust producing unit is arranged near the trailing edge of the lower wing. The inboard lower wing thrust producing unit may be supported by a third wing pod which is preferably mounted on the lower wing at the wing transition region of the inboard section and the outboard section of the lower wing. The third wing pod preferably extends in the direction of the trailing edge of the lower wing such that the inboard lower wing thrust producing unit is arranged near the trailing edge of the lower wing.

Advantageously, respective batteries that are used to power the thrust producing units may at least partially be housed within the first to third wing pods. Arranging batteries, at least partially, away from the fuselage is deemed to be advantageous in terms of cooling capabilities of the batteries and protection of respective occupants of the inventive VTOL aircraft from burning batteries in case of a crash scenario.

Furthermore, the third wing pod which is mounted to the lower wing at the wing transition region between the inboard section and the outboard section of the lower wing may be adapted to accommodate at least partially a main landing gear. This main landing gear may be a wheel-type landing gear.

Preferably, the outboard upper wing thrust producing unit defines a rotor disc in operation which is located above the cabin of the inventive VTOL multirotor aircraft, whereas the inboard lower wing thrust producing unit defines a rotor disc in operation which may be located below the cabin, in order to keep the rotor discs at a sufficient safety distance away from the cabin so that e. g. associated rotor blades may not penetrate the fuselage upon occurrence of rotor burst. Moreover, the outboard lower wing thrust producing unit is preferably arranged at a lower height than the outboard upper wing thrust producing unit, but at a height that is above the inboard lower wing thrust producing unit's height. As the outboard lower wing thrust producing unit is, thus, arranged at the height of the cabin, a rotor disc that is defined by the outboard lower wing thrust producing unit in operation may be canted such that e. g. associated rotor blades may not penetrate the fuselage upon occurrence of rotor burst.

Advantageously, flight stability of the inventive VTOL multirotor aircraft is achieved by arranging some thrust producing units of the thrust producing units assembly ahead of the upper wing, i. e. near the leading edge of the upper wing, and some other thrust producing units of the thrust producing units assembly behind the lower wing, i. e. near the trailing edge of the lower wing.

More specifically, in order to achieve flight stability, a balance of lift with respect to the center of gravity of the inventive VTOL multirotor aircraft must be created. During vertical flight or hover, lift is mainly generated by thrust producing units of the thrust producing units assembly that essentially produce lift, whereas during forward flight lift is simultaneously provided by the thrust producing units that essentially produce lift and the joined wings. Therefore, in both flight scenarios a balance with respect to the center of lift, the amount of lift created at the joined wings and by means of the thrust producing units that essentially produce lift on one hand, and the center of gravity of the inventive VTOL multirotor aircraft on the other hand must be achieved.

In the inventive VTOL multirotor aircraft, the joined-wing configuration offers substantial advantages for achieving an improved balance between wing lift and thrust producing unit lift in both flight scenarios. These advantages translate to improved stability and controllability characteristics of the VTOL multirotor aircraft. In fact, achievement of such an improved balance is advantageously achieved using the joined-wing configuration and deemed to be more challenging with respect to design of a mono-wing aircraft, especially when willing to avoid arrangement of thrust producing units within a required boarding area, either ahead or behind a respective mono wing, for operational safety reasons.

Preferably, the joined-wing configuration of the inventive VIOL multirotor aircraft has joined wings with lower wings, which are swept rearward, and upper wings, which are swept forward, wherein the lower and upper wings exhibit in top view a maximum longitudinal distance from each other at their respective roots, i. e. close to the fuselage, and a minimum longitudinal distance at their respective outboard sections, where they are interconnected. According to one aspect, two outboard thrust producing units that essentially produce lift are mounted to the outboard sections of each joined wing, one near a leading edge of the upper wing and another one near a trailing edge of the lower wing. A third thrust producing unit that essentially produces lift is preferably mounted to the inboard section of the lower wing at the wing transition region, and extends in top view of the VTOL multirotor aircraft in an area that is enclosed by both the upper and the lower wings. Thus, a resulting center of lift of the three lifting thrust producing units that essentially produce lift may easily match a resulting center of lift of the upper and lower wings whilst avoiding substantial interferences between the joined wing and respective wakes of the thrust producing units.

Advantageously, as the outboard upper wing thrust producing units are mounted at least approximatively at a height that corresponds to a respective cabin height, a convenient clearance for possible bystanders can be guaranteed. Furthermore, as the thrust producing units that are mounted to the lower wing extend near the trailing edge of the lower wing, i. e. behind the lower wing, a frontal boarding area can be provided that is beneficially free of obstructive and life-threatening thrust producing units and, therefore, stands out by a high level of safety for boarding and emergency exit. Moreover, as the thrust producing units that are mounted to the lower wing, i. e. at least associated rotor discs, cam be arranged essentially below the cabin and, thus, below the fuselage as such, passengers and critical equipment are not impacted in case of rotor burst.

In addition, due to a comparatively high vertical position of the outboard lower wing thrust producing units with respect to ground, the fuselage can be set closer to the ground, facing the required clearance to avoid striking the wings tips on the ground in case of a bad landing condition. Due to the proximity of the fuselage and lower wing inboard section to the ground, the size and weight of the wheeled landing gear can be kept low.

Furthermore, a suitable lower wing design may allow for an adjustment of a large landing gear track without extra weight. This leads to an improved ground stability behavior and to a reduction of the structural loads during a hard landing case.

Preferably, the at least one upper wing and the at least one lower wing are interconnected via an intermediate pylon to form the joined-wing configuration. The intermediate pylon is mounted to the upper wing tip and to the lower wing outboard section near the lower wing tip.

Preferably, the at least one lower wing comprises a wing transition region that interconnects the lower wing inboard section and the lower wing outboard section. At least one third thrust producing unit is non-tiltably mounted to the at least one lower wing near the trailing edge of the at least one lower wing and provided for generating lift at least during vertical taking-off and landing. The at least one third thrust producing unit is arranged near the wing transition region.

Preferably, a first wing pod is mounted to the upper wing tip for supporting the first thrust producing unit. A second wing pod is mounted to the lower wing tip for supporting the second thrust producing unit. At least one third wing pod is mounted to the at least one lower wing in the wing transition region for supporting the at least one third thrust producing unit.

Preferably, the at least one lower wing is a rearward-swept wing and the at least one upper wing is a forward-swept wing.

Preferably, the lower wing outboard section is upwardly inclined by a predetermined positive dihedral angle relative to the lower wing inboard section.

Preferably, the at least one upper wing is downwardly inclined by a predetermined negative dihedral angle.

Preferably, the at least one upper wing comprises an upper wing inboard section that is connected to the vertical fin and an upper wing outboard section that forms the upper wing tip. The upper wing outboard section is downwardly inclined by the predetermined negative dihedral angle relative to the upper wing inboard section.

Preferably, at least one additional thrust producing unit of the thrust producing units assembly is fixedly inclined with respect to a roll axis of the multirotor aircraft for generating forward thrust at least during cruise operation at the multirotor aircraft.

Preferably, the at least one additional thrust producing unit is non-tiltably mounted to the at least one upper wing and arranged near a trailing edge of the at least one upper wing.

Preferably, an additional wing pod is mounted to the upper wing for supporting the additional thrust producing unit.

Preferably, the at least one upper wing is at least approximately V-shaped.

Preferably, the lower wing inboard section and the lower wing outboard section delimit a boarding area of the multirotor aircraft.

Preferably, the boarding area is equipped with at least one boarding step that is adapted to support accessing of a cabin formed within the fuselage, and the at least one boarding step is arranged near a leading edge of the at least one lower wing. The first thrust producing unit defines an associated rotor disc in operation that is arranged at a predetermined safety distance from the at least one boarding step.

Preferably, the first thrust producing unit defines an associated rotor disc in operation that is arranged in height direction of the multirotor aircraft at least approximately at a height that corresponds to a respective cabin height, or above.

According to one aspect, the inventive VTOL multirotor aircraft is adapted for transportation of passengers.

Advantageously, the inventive VTOL multirotor aircraft is not only designed for transportation of passengers, but is, in particular, suitable and adapted for being certificated for operation within urban areas. It is preferably easy to fly, has multiple redundancies, meets the safety demands of the authorities, is cost efficient in design and only creates comparatively low noise. Preferably, the inventive VTOL multirotor aircraft has comparatively small rotor diameters with light weight design and is nevertheless adapted for fulfillment of an emergency landing.

Furthermore, the inventive VTOL multirotor aircraft is preferably capable of hovering and comprises a distributed propulsion system.

Advantageously, the inventive VTOL multirotor aircraft increases respective flight capabilities and economy of multirotor aircrafts significantly. Moreover, the inventive arrangement of the thrust producing units allows a reduction of negative interactional effects between front and rear parts of the inventive VTOL multirotor aircraft significantly.

It should be noted that although the inventive VTOL multirotor aircraft is described above with reference to a multirotor structure with multiple rotor assemblies, wherein each thrust producing unit may be composed of one or two counter-rotating rotors the term rotor should be understood as meaning any kind of bladed propulsive devices. In other words, any reference to rotors or rotor structures in the present description should likewise be understood as a reference to propellers and propeller structures, so that the inventive multirotor aircraft can likewise be implemented as a multipropeller and/or multipropeller and -rotor aircraft. In any case, the present invention principally relates to a multiple thrust configuration with rotors that define rotor planes, which can be selected to be positioned atop of each other individually, a partial or full shrouding for enclosing any rotating parts of at most one of the rotors, and preferably at least one electrical engine which drives each rotor.

BRIEF DESCRIPTION OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1:
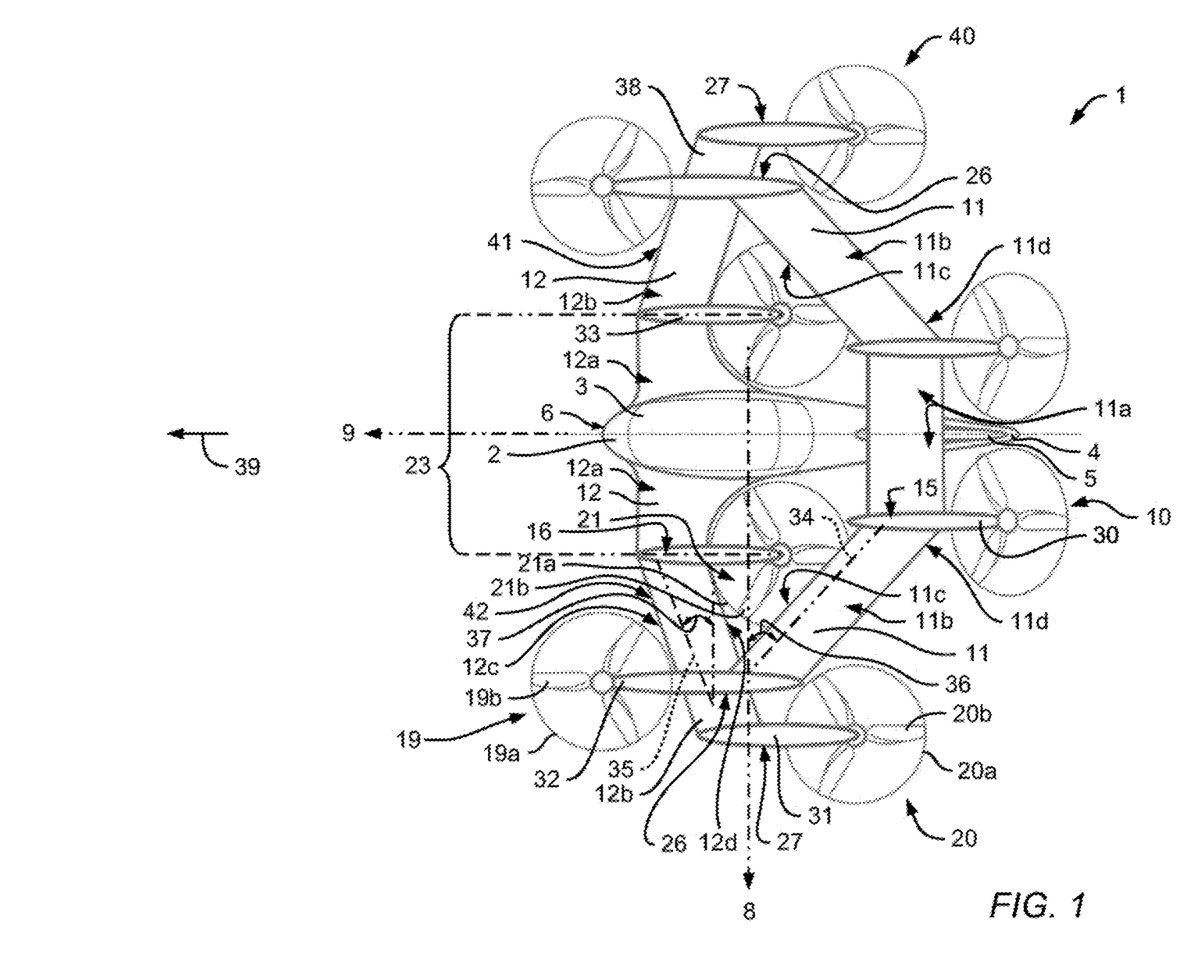
FIG. 1 shows a top view of a multirotor aircraft that is adapted for vertical take-off and landing.

FIG. 1 shows a multirotor aircraft 1 that is adapted for vertical take-off and landing and that is referred to as the "VTOL multirotor aircraft 1" hereinafter, for simplicity and clarity. A forward flight direction of the VTOL multirotor aircraft 1 is exemplarily shown by an arrow 39.

Figure 2:
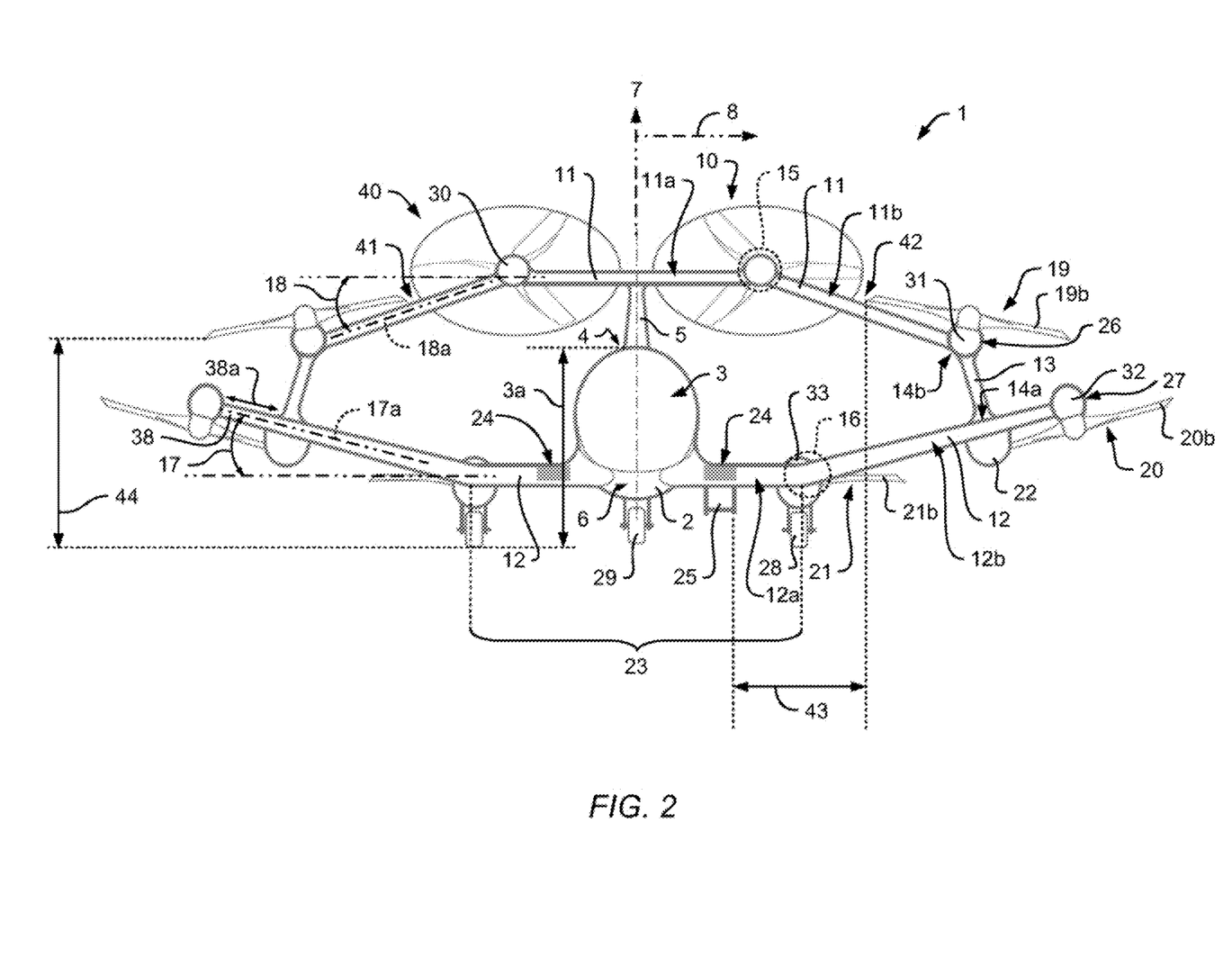
FIG. 2 shows a front view of the multirotor aircraft of FIG. 1.

For purposes of illustration, the VTOL multirotor aircraft 1 is shown with three mutually orthogonal directions forming a three-dimensional frame of reference. A "longitudinal" direction corresponds to a respective roll axis 9 that is inherent to the VTOL multirotor aircraft 1, which is also referred to as "X-axis 9" hereinafter. Another direction, said to be "transverse", is perpendicular to the roll axis 9 and corresponds to a respective pitch axis 8 of the VTOL multirotor aircraft 1. This transverse direction is also referred to as "Y-axis 8" hereinafter. A respective XY-plane formed by the X- and Y-axes 9, 8 is considered to be "horizontal" and corresponds to a top view plane of the VTOL multirotor aircraft 1 as illustrated in FIG. 1. A third direction corresponds to a respective yaw axis (7 in FIG. 2) of the VTOL multirotor aircraft 1, which is oriented perpendicular to the horizontal XY-plane and also referred to as "Z-axis 7". A respective YZ-plane formed by the Y- and Z-axes 8, 7 (in FIG. 2) corresponds to a front view plane of the VTOL multirotor aircraft 1 (cp. FIG. 2). According to one aspect, the VTOL multirotor aircraft 1 is at least essentially symmetrical with respect to the YZ-plane.

The VTOL multirotor aircraft 1 illustratively comprises a fuselage 2 that is exemplarily provided with a cabin 3 and a tail boom 4. The fuselage 2 exemplarily defines an aircraft front region 6 that is opposed to the tail boom 4 in direction of the X-axis 9. Preferably, a vertical fin 5 is rigidly mounted to the tail boom 4. Furthermore, the VTOL multirotor aircraft 1 preferentially comprises a thrust producing units assembly 40 that is provided for producing thrust in operation.

The VTOL multirotor aircraft 1 preferably comprises at least one upper wing 11 and at least one lower wing 12. The at least one upper wing 11 is joined to the at least one lower wing 12 in a joined-wing configuration. Illustratively, the upper and lower wings 11, 12 form a portside wing assembly 41 and a starboard wing assembly 42.

More specifically, the joined-wing configuration comprises by way of example at least one pair of upper and lower wings 11, 12 arranged on a portside of the VTOL multirotor aircraft 1, which form the portside wing assembly 41. The joined-wing configuration further comprises by way of example at least one other pair of upper and lower wings 11, 12 arranged on a starboard side of the VTOL multirotor helicopter 1, which form the starboard side wing assembly 42. The portside wing assembly 41 is connected to the starboard side wing assembly 42 through the upper wings 11 and through the fuselage 2.

It should be noted that for clarity and simplicity of the drawings essentially only the upper wing 11 and the lower wing 12 of the starboard side wing assembly 42 are labeled with respective reference signs and described in greater detail hereinafter. This more detailed description of the starboard side wing assembly 42 should be understood as being representative for both wing assemblies 41, 42, as they preferably exhibit a similar configuration due to the preferred symmetry of the VTOL multirotor aircraft 1 with respect to the YZ-plane. However, the description may also refer to the configuration of the starboard side wing assembly 42 with reference to reference signs that are only used for clarity of the drawings to label components of the portside wing assembly 41, such as e. g. a wing extension 38 as described below.

Preferably, the upper wing 11 comprises an upper wing inboard section 11a that is connected to the vertical fin 5, and an upper wing outboard section 11b, which forms an upper wing tip 26. The upper wing inboard section is preferentially rigidly mounted to the vertical fin 5. The upper wing 11 may further comprises a wing transition region 15 that interconnects the upper wing inboard section 11a and the upper wing outboard section 11b. The upper wing 11 illustratively comprises an upper wing leading edge 11c and an upper wing trailing edge 11d, opposed to the leading edge 11c in direction of the X-axis 9.

The upper wing inboard section 11a is preferably extending in parallel to the horizontal plane, i. e. the XY-plane. The upper wing 11 has illustratively an upper wing quarter chord line 34 that spans 25% of a respective upper wing chord.

Moreover, the lower wing 12 preferably comprises a lower wing inboard section 12a that is connected to the fuselage 2, and a lower wing outboard section 12b that forms a lower wing tip 27. The lower wing inboard section 12a may be rigidly mounted near the aircraft front region 6 of the fuselage 2 and extend below the cabin 3. The lower wing 12 may comprise a wing transition region 16 that interconnects the lower wing inboard section 12a and the lower wing outboard section 12b. The lower wing 12 illustratively comprises a lower wing leading edge 12c and a lower wing trailing edge 12d.

The lower wing inboard section 12a is preferably extending in parallel to the horizontal plane, i. e. the XY-plane. The lower wing 12 has illustratively a lower wing quarter chord line 35 that spans 25% of a respective lower wing chord.

Preferably, the upper and lower wings 11, 12 exhibit different sweep angles. Each sweep angle is defined as an angle of a respective one of the quarter chord lines 34, 35 with respect to the transverse Y-axis 8 of the VTOL multirotor aircraft 1. More specifically, an upper wing sweep angle 36 is illustratively defined by an inclination of the upper wing quarter chord line 34 relative to the transverse Y-axis 8. Preferably, this inclination is such that the upper wing 11 is embodied as a forward-swept wing. Similarly, a lower wing sweep angle 37 is illustratively defined by an inclination of the lower wing quarter chord line 35 relative to the transverse Y-axis 8 such that the lower wing 12 is preferably a rearward-swept wing.

Preferably, the upper and lower wings 11, 12 are at least interconnected by means of an intermediate pylon (13 in FIG. 2) to form the joined-wing configuration. However, a wing extension 38 of the lower wing 12 may extend in direction of the transverse Y-axis 8 behind a wing interconnection (14a in FIG. 2) of the intermediate pylon (13 in FIG. 2) to the lower wing outboard section 12b starting from the wing interconnection (14a in FIG. 2) and ending at the lower wing tip 27.

According to one aspect, the VTOL multirotor aircraft 1 comprises a thrust producing units assembly 40 that is adapted for generating lift and thrust in operation. The trust producing units assembly 40 is preferably configured such that the starboard side wing assembly 42 preferably comprises at least an outboard upper wing thrust producing unit 19, an outboard lower wing thrust producing unit 20, an inboard lower wing thrust producing unit 21, and an additional rear thrust producing unit 10. Illustratively, each one of the thrust producing units 19, 20, 21 defines an associated thrust producing unit's rotor disc, respectively 19a, 20a and 21a, in operation by means of at least one rotating thrust producing unit's rotor blade, respectively 19b, 20b and 21b.

The outboard upper wing thrust producing unit 19 is preferably non-tiltably mounted to the upper wing 11 of the starboard side wing assembly 42 and provided for generating lift at least during vertical taking-off and landing. The outboard upper wing thrust producing unit 19 is preferentially arranged near the leading edge 11c of the upper wing 11 of the starboard side wing assembly 42. Illustratively, the outboard upper wing thrust producing unit 19 may be supported by a wing pod 32. The wing pod 32 may be mounted to the upper wing tip 26 of the starboard side wing assembly 42.

The outboard lower wing thrust producing unit 20 of the thrust producing units assembly 40 is preferably non-tiltably mounted to the lower wing 12 of the starboard side wing assembly 42 and provided for generating lift at least during vertical taking-off and landing. The outboard lower wing thrust producing unit 20 is preferentially arranged near the trailing edge 12d of the lower wing 12 of the starboard side wing assembly 42. The outboard lower wing thrust producing unit 20 may be supported by a wing pod 31. The wing pod 31 may be mounted to the lower wing tip 27.

The inboard lower wing thrust producing unit 21 of the thrust producing units assembly 40 is preferably non-tiltably mounted to the lower wing 12 of the starboard side wing assembly 42, preferentially near the trailing edge 12d of the lower wing 12, and provided for generating lift at least during vertical taking-off and landing. The inboard lower wing thrust producing unit 21 may be arranged near the wing transition region 16 from the lower wing inboard section 12a to the lower wing outboard section 12b. The inboard lower wing thrust producing unit 21 may be supported by a wing pod 33. The wing pod 33 may be mounted to the lower wing 12 in the wing transition region 16.

The additional rear thrust producing unit 10 of the thrust producing units assembly 40 is preferably non-tiltably mounted to the upper wing 11 of the starboard side wing assembly 42 and preferentially arranged near the trailing edge 11d of the upper wing 11 of the starboard side wing assembly 42. Illustratively, the additional rear thrust producing unit 10 is fixedly inclined with respect to the X-axis 9 of the VTOL multirotor aircraft 1 for generating forward thrust at least during cruise operation of the VTOL multirotor aircraft 1. The at least one additional rear thrust producing unit 10 may be supported by an additional wing pod 30. The additional wing pod 30 may be mounted to the upper wing 11 of the starboard side wing assembly 42. Preferably, the additional wing pod 30 is mounted at the wing transition region 15 of the upper wing inboard section 11a to the upper wing outboard section 11b.

According to one aspect, the VTOL multirotor aircraft 1 comprises a boarding area 23 for passengers of the VTOL multirotor aircraft 1. The boarding area 23 is preferably designed free of thrust producing units in order to enable a safe and secure access of the passengers to the cabin 3. Accordingly, it is illustratively arranged near the aircraft front region 6 at the leading edge 12c of the starboard side lower wing inboard section 12a and the portside lower wing inboard section 12a. The boarding area 23 is respectively delimited on the starboard side and on the portside of the VTOL multirotor aircraft 1 by the wing transition region 16 of the lower wing inboard section 12a to the lower wing outboard section 12b.

Furthermore, in order to further increase safety during boarding, the rotor disc 19a of the outboard upper wing thrust producing unit 19 is preferably arranged in direction of the Z-axis (7 in FIG. 2) above the upper wing outboard section 11b and the rotor disc 21a of the inboard lower wing thrust producing unit 21 is preferably arranged in direction of the Z-axis (7 in FIG. 2) at least approximately at the height of the lower wing inboard section 11a and below the lower wing outboard section 12b. According to one aspect, the lower wing inboard section 11a may be shaped at its trailing edge 12d such that the lower wing 12 forms at least a partial shrouding for the inboard lower wing thrust producing unit 21.

FIG. 2 shows the VTOL multirotor aircraft 1 of FIG. 1 with the fuselage 2, the tail boom 4 to which the vertical fin 5 is rigidly mounted, and the thrust producing units assembly 40. Illustratively, each one of the thrust producing units 19, 20, 21 of the thrust producing units assembly 40 defines its associated rotor disc 19a, 20a, 21a in operation and comprises at least the rotor blade 19b, 20b, 21b. Furthermore, each one of the thrust producing units 19, 20, 21 of the thrust producing units assembly 40 may be supported by one of the wing pods 31, 32, 33. The VTOL multirotor aircraft 1 further comprises the upper and lower wings 11, 12 in joined-wing configuration, with the starboard side wing assembly 42 and the portside wing assembly 41 which respectively comprise the upper wing 11 and the lower wing 12.

FIG. 2 further illustrates yaw axis 7, i. e. Z-axis 7, which defines a height direction of the VTOL multirotor aircraft 1, as well as the pitch axis 8, i. e. the Y-axis 8, both of which are inherent to the VTOL multirotor aircraft 1. FIG. 2 also further illustrates the upper wing 11 that is provided with the additional rear thrust producing unit 10 of the thrust producing units assembly 40.

Moreover, as described above with reference to FIG. 1, the upper wing 11 comprises the upper wing inboard section 11a in which is rigidly mounted to the vertical fin 5, and the upper wing outboard section 11b which is mounted to the upper wing inboard section 11a at the wing transition region 15. Illustratively, the upper wing inboard sections 11a of the portside wing assembly 41 and the starboard side wing assembly 42 are integrally formed in one piece.

According to one aspect, the upper and lower wings 11, 12 are at least interconnected by means of an intermediate pylon 13 to form the joined-wing configuration. The intermediate pylon 13 is preferably rigidly mounted to the upper wing tip 26 at a wing interconnection 14b, and rigidly mounted to the lower wing outboard section 12b near the lower wing tip 27 at a wing interconnection 14a. The intermediate pylon 13 preferably essentially extends vertically with respect to the upper surface of the lower wing outboard section 12b to which it is connected, i. e. at least essentially in parallel to the Z-axis 7.

Preferably, a wing extension 38 of the lower wing 12 extends from the wing interconnection 14a of the intermediate pylon 13 and the lower wing outboard section 12b towards the lower wing tip 27. The wing extension 38 may exhibit a length 38a that is determined such that the outboard lower wing thrust producing unit and the inboard lower wing thrust producing unit 21 are sufficiently spaced apart to avoid undesired interferences between both thrust producing units 20, 21.

Moreover, the outboard upper wing thrust producing unit 19 that defines according to FIG. 1 the associated rotor disc 19a in operation is preferably arranged in the height direction 7 of the VTOL multirotor aircraft 1 at least approximately at a height 44 that corresponds at least to a respective cabin height 3a, or above. The cabin height 3a is illustratively defined as the height between ground and an upper fuselage region, which is exemplarily arranged below a minimum height of the upper wing 11.

According to one aspect, the upper wing 11 exhibits a negative dihedral relative to the transverse Y-axis 8 of the VTOL multirotor helicopter 1, i. e. the upper wing 11 is downwardly inclined by a predetermined negative dihedral angle 18 relative to the upper wing inboard section 11a. Moreover, the lower wing 12 preferably exhibits a positive dihedral relative to the transverse Y-axis 8 of the VTOL multirotor aircraft 1, i. e. the lower wing 12 is upwardly inclined by a predetermined positive dihedral angle 17 relative to the lower wing inboard section 12a. The dihedral angles 17, 18 are defined as angle of the respective centroidal axes 17a, 18a, of the upper and lower wings 11, 12 with respect to the horizontal plane of the multirotor aircraft 1, i. e. the XY-plane.

By way of example, the VTOL multirotor aircraft 1 comprises a wheel-type landing gear with a wheel-type main landing gear 28 and a wheel-type nose landing gear 29. The wheel-type main landing gear 28 is preferably at least partly mounted to the wing pod 33 which is provided at the wing transition region 16 of the lower wing inboard section 12a to the lower wing outboard section 12b. More particularly, the wheel-type main landing gear 28 is preferentially at least partly retractable into the wing pod 33 in operation of the VTOL multirotor aircraft 1. The wheel-type nose landing gear 29 is preferably arranged at the aircraft front region 6 of the fuselage 2, i. e. upstream of the wheel-type main landing gear 28.

According to one aspect, the lower wing outboard section 12b is provided with at least one container 22. The at least one container 22 is exemplarily arranged at the wing interconnection 14b where the intermediate pylon 13 is preferably rigidly mounted to the upper wing tip 26. Preferably, the at least one container 22 exhibits an external geometry that can be determined in an application-specific manner with respect to respectively underlying requirements in order to allow, for example, storage of an associated equipment, such as batteries. Illustratively, the at least one container 22 has a slightly rounded shaping.

As described above with reference to FIG. 1, the boarding area 23 of the VTOL multirotor aircraft 1 is extended on the starboard side and the portside at least to the respective wing transition region 16 of the lower wing inboard section 12a to the lower wing outboard section 12b. The boarding area 23 may be equipped with at least one lower boarding step 25.

The at least one lower boarding step 25 is preferably adapted to support accessing of the cabin 3 formed within the fuselage 2. Illustratively, the at least one lower boarding step 25 is arranged near the leading edge 12c of the lower wing 12. Furthermore, by way of example, the lower boarding step 25 leads to an upper step 24 in the boarding area 23, located on the lower wing inboard section 12a and allowing a passenger to access the cabin 3.

Furthermore, the at least one lower boarding step 25 is arranged at a predetermined safety distance 43 away from the outboard upper wing thrust producing unit 19 for safety reasons. The safety distance 43 is defined as the available space between the boarding step 25 and the rotor disc (19a in FIG. 1) of the outboard upper wing thrust producing unit 19.

Figure 3:
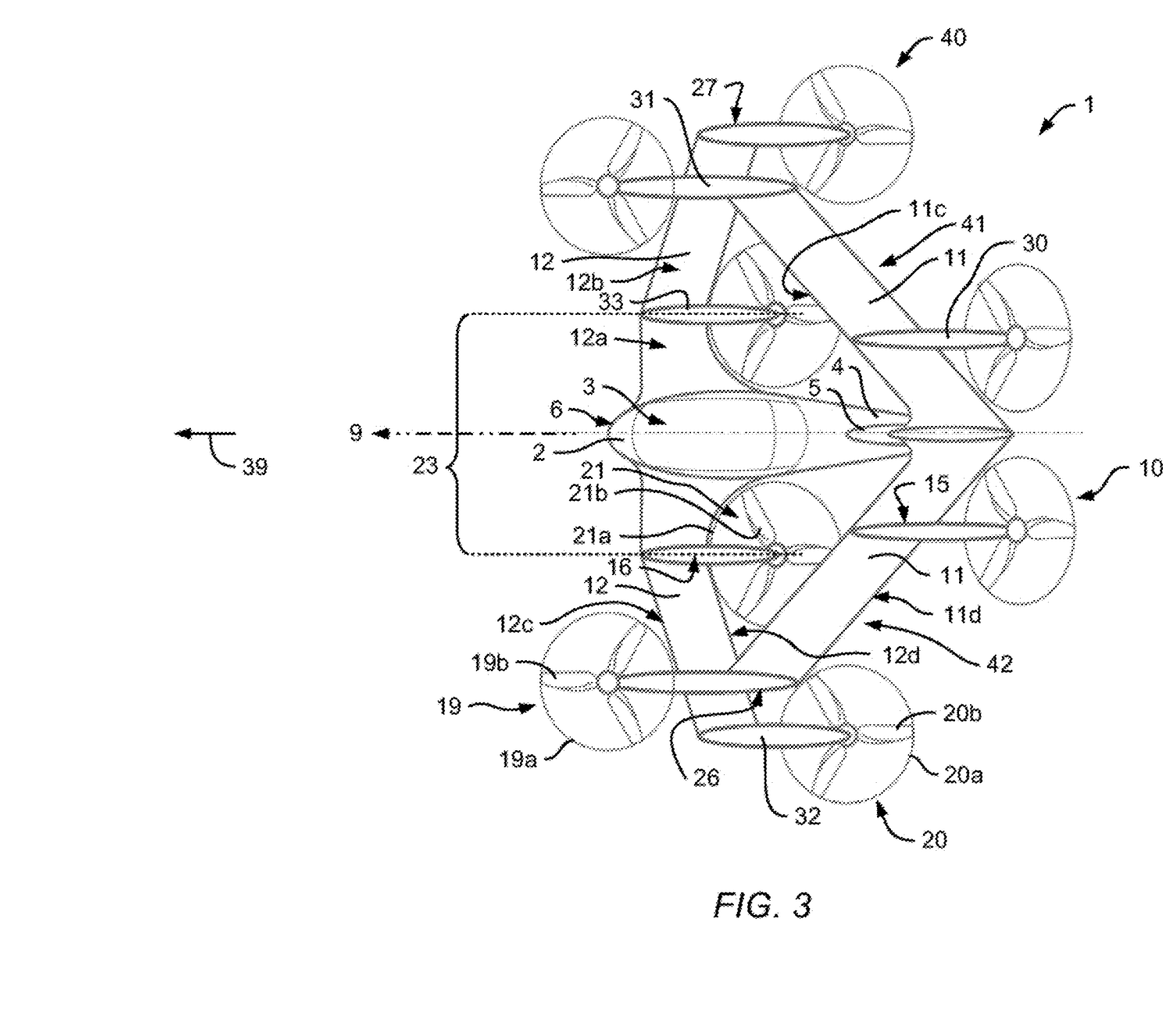
FIG. 3 shows a top view of the multirotor aircraft of FIG. 1 with an upper wing having a different configuration.

FIG. 3 shows the VTOL multirotor aircraft 1 of FIG. 1 and FIG. 2 with the fuselage 2, the tail boom 4 with the vertical fin 5, the cabin 3, and the thrust producing units assembly 40. The trust producing units assembly 40 comprises the outboard upper wing thrust producing unit 19, the outboard lower wing thrust producing unit 20, the inboard lower wing thrust producing unit 21, and the additional rear thrust producing unit 10.

FIG. 3 further illustrates the pitch axis 8, i. e. the Y-axis, and the roll axis 9, i. e. the X-axis, both of which are inherent to the VTOL multirotor aircraft 1. The VTOL multirotor aircraft 1 comprises the upper and lower wings 11, 12 in the joined-wing configuration, which comprises the portside wing assembly 41 and the starboard side wing assembly 42.

However, in contrast to FIG. 1 the upper wings 11 together are now at least approximately V-shaped. In other words, each one of the upper wings 11 is now no more kinked as it is in FIG. 1 and at the respective wing transition region 15 there is no transition between upper wing inboard and outboard sections 11a, 11b as illustrated in FIG. 1. Instead, the wing transition region 15 of each one of the upper wings 11 now merely defines a location where one of the additional wing pods 30 is arranged.

Figure 4:
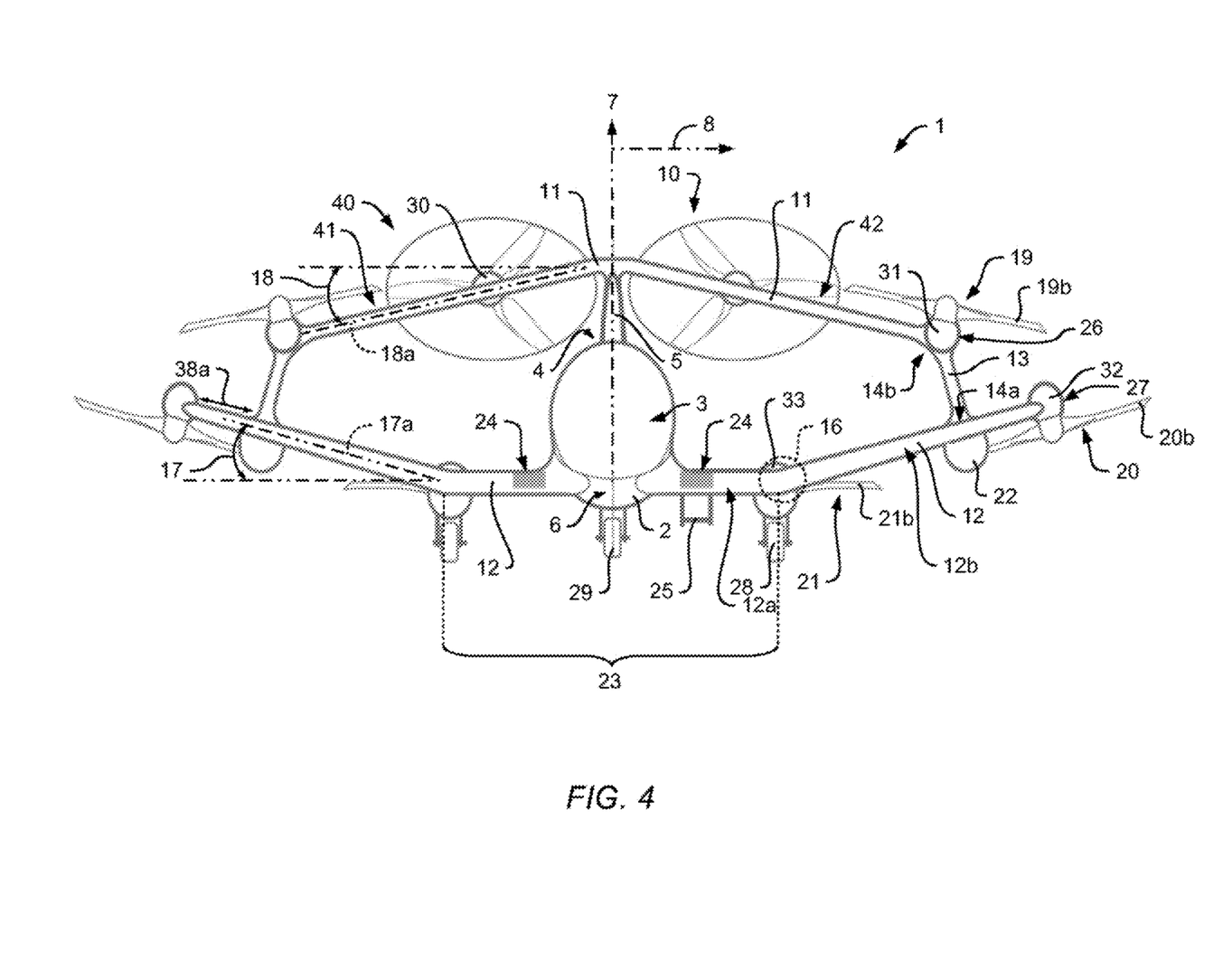
FIG. 4 shows a front view of the multirotor aircraft of FIG. 3.

FIG. 4 shows the VTOL multirotor aircraft 1 of FIG. 3 with the fuselage 2, the tail boom 4 to which the vertical fin 5 is rigidly mounted, the cabin 3, and the thrust producing units assembly 40. The trust producing units assembly 40 comprises the outboard upper wing thrust producing unit 19, the outboard lower wing thrust producing unit 20, the inboard lower wing thrust producing unit 21, and the additional rear thrust producing unit 10.

The VTOL multirotor aircraft 1 comprises the upper and lower wings 11, 12 the joined-wing configuration, which define the portside wing assembly 41 and the starboard side wing assembly 42. FIG. 4 further illustrates the V-shaped form of the upper wings 11 of the portside wing assembly 41 and the starboard side wing assembly 42, which are preferably integrally formed in one piece and rigidly mounted to the vertical fin 5.

Figure 5:
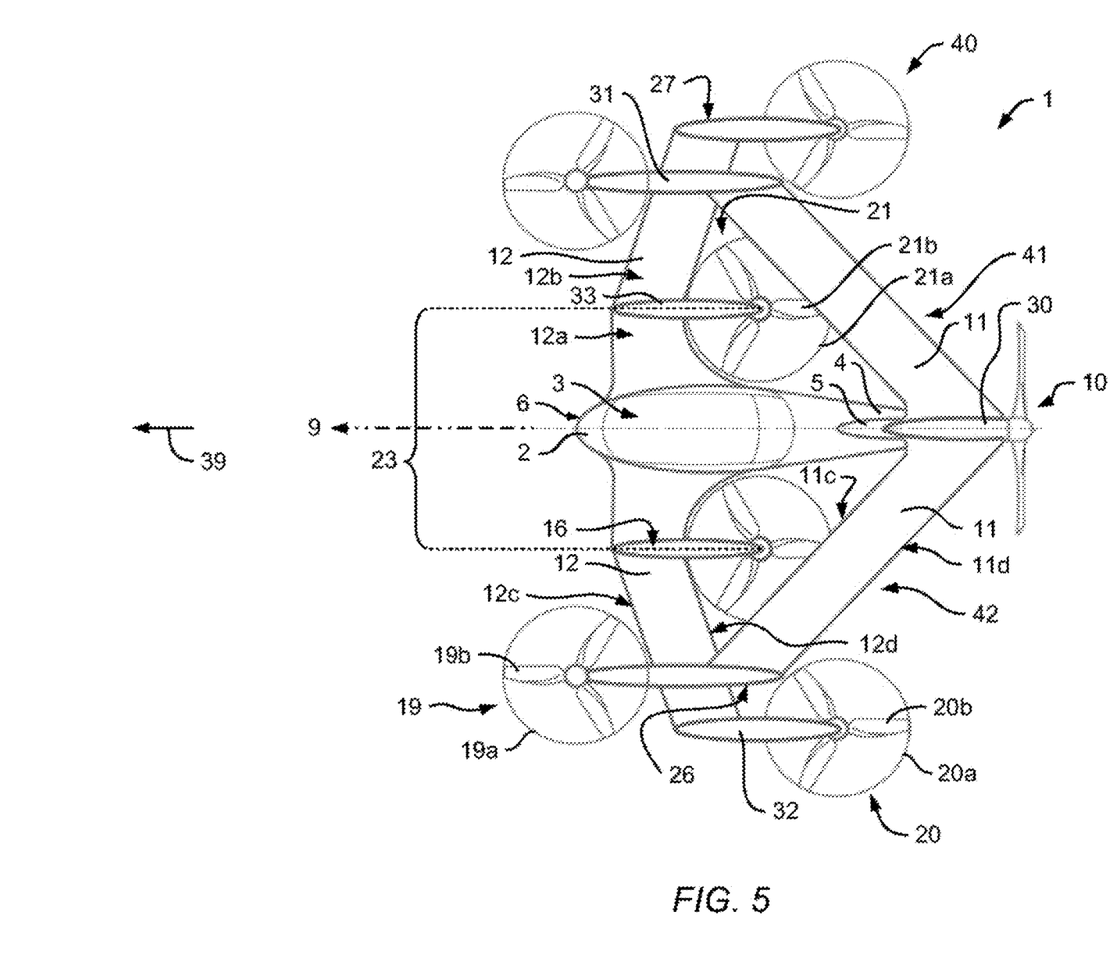
FIG. 5 shows a top view of the multirotor aircraft of FIG. 1 with a single rear thrust producing unit.

FIG. 5 shows the VTOL multirotor aircraft 1 of FIG. 3 with the fuselage 2, the tail boom 4 to which the vertical fin 5 is rigidly mounted, the cabin 3, and the thrust producing units assembly 40. The trust producing units assembly 40 comprises the outboard upper wing thrust producing unit 19, the outboard lower wing thrust producing unit 20, the inboard lower wing thrust producing unit 21, and the additional rear thrust producing unit 10. The VTOL multirotor aircraft 1 comprises the upper and lower wings 11, 12 in the joined-wing configuration, which form the portside wing assembly 41 and the starboard side wing assembly 42.

As described above with reference to FIG. 3, both upper wings 11 of the portside wing assembly 41 and the starboard side wing assembly 42 are together preferably at least approximately V-shaped. However, in contrast to FIG. 3 now only a single additional rear thrust producing unit 10 is provided. The single additional rear thrust producing unit 10 is preferably fixedly oriented perpendicular to the XY-plane of the VTOL multirotor aircraft 1, as described above at FIG. 1, for generating forward thrust at least during cruise operation of the multirotor aircraft 1. The single additional rear thrust producing unit 10 is preferably non-tiltably mounted near a trailing edge 11d of the upper wings 11 to an associated single additional wing pod 30 which is preferentially mounted at an interconnection region of both upper wings 11 to the vertical fin 5, i. e. at an interconnection region of the starboard side wing assembly 42 and the portside wing assembly 41 at the vertical fin 5.

Figure 6:
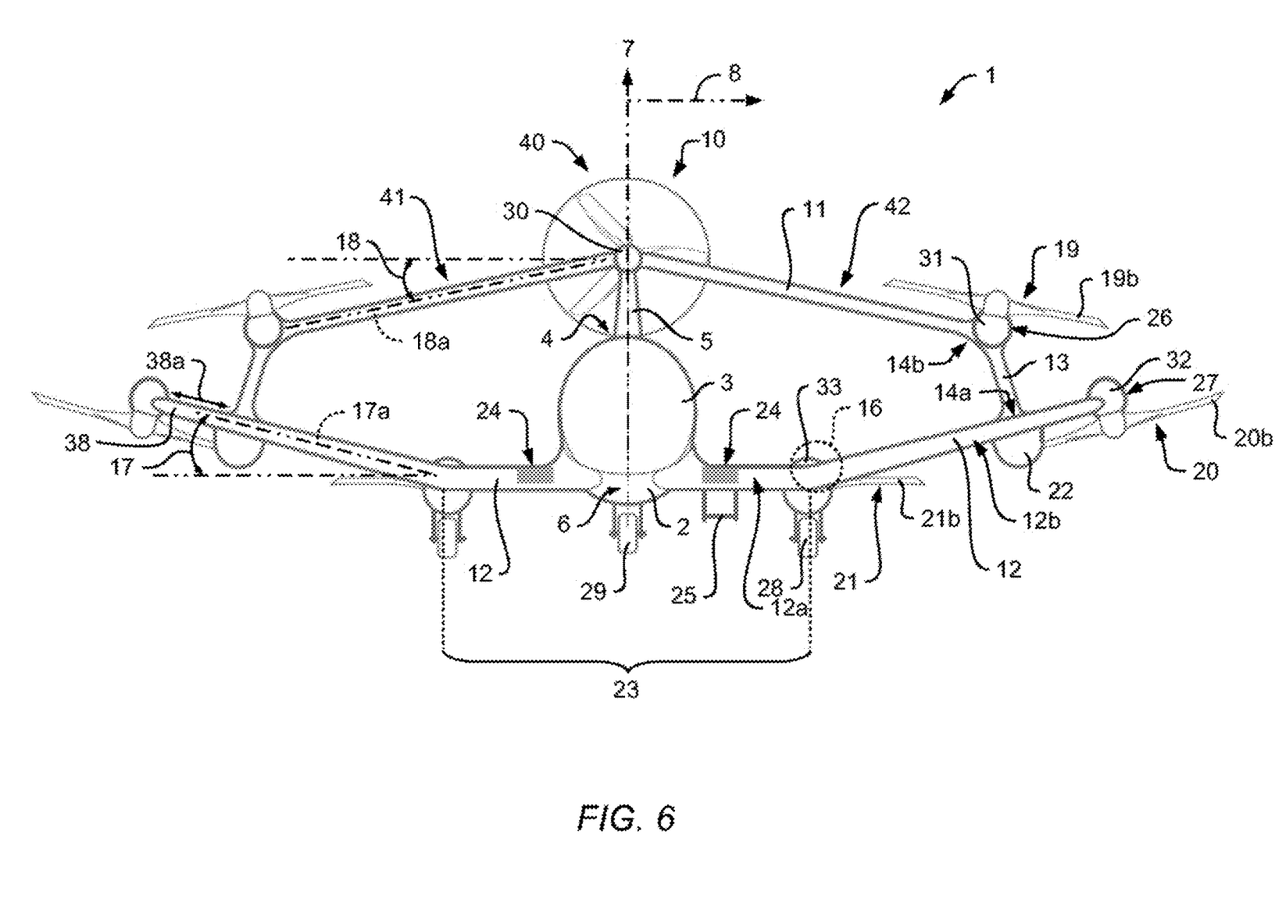
FIG. 6 shows a front view of the multirotor aircraft of FIG. 5.

FIG. 6 shows the multirotor aircraft 1 of FIG. 5 with the fuselage 2, the tail boom 4 to which the vertical fin 5 is rigidly mounted, the cabin 3, and the thrust producing units assembly 40. The trust producing units assembly 40 comprises the outboard upper wing thrust producing unit 19, the outboard lower wing thrust producing unit 20, the inboard lower wing thrust producing unit 21 and the additional rear thrust producing unit 10. In particular, FIG. 6 further illustrates the vertical orientation of the additional rear thrust producing unit 10 and its arrangement with respect to the fuselage 2.

Finally, it should be noted that modifications to all variants described above are within the common knowledge of the person skilled in the art and, thus, also considered as being part of the present invention.

Furthermore, it is again pointed out that each one of the portside wing assembly 41 and the starboard side wing assembly 42 as illustrated in any one of FIG. 1 to FIG. 6 has an associated upper wing 11 and an associated lower wing 12 which respectively form the joined-wing configuration. In other words, the VTOL multirotor aircraft 1 of each one of FIG. 1 to FIG. 6 comprises two upper wings 11, one of which is associated with the portside wing assembly and the other one is associated with the starboard side wing assembly 42, and two lower wings 12, one of which is associated with the portside wing assembly 41 and the other one is associated with the starboard side wing assembly 42. Therefore, all reference signs in FIG. 1 to FIG. 6 which are merely applied to one of the portside wing assembly 41 or the starboard side wing assembly 42, for purposes of clarity and in order not to overload the respective drawing figure, should be considered as being likewise applicable to the respective other wing assembly. Similarly, the description may only refer to one of the portside wing assembly 41 or the starboard side wing assembly 42 where appropriate, for purposes of simplicity.

REFERENCE LIST

1 Multirotor aircraft
2 Fuselage
3 Cabin
3a Cabin height
4 Tail boom
5 Vertical fin
6 Aircraft front region
7 Yaw axis rasp. height direction
8 Pitch axis
9 Roll axis
10 Rear thrust producing unit
11 Upper wing
11a Upper wing inboard section
11b Upper wing outboard section
11c Upper wing leading edge
11d Upper wing trailing edge
12 Lower wing
12a Lower wing inboard section
12b Lower wing outboard section
12c Lower wing leading edge
12d Lower wing trailing edge
13 Intermediate pylon
14a Wing interconnection of intermediate pylon and lower wing outboard section
14b Wing interconnection of intermediate pylon and upper wing
15 Wing transition region of upper wing inboard section and upper wing outboard section
16 Wing transition region of lower wing inboard section and lower wing outboard section
17 Dihedral angle of lower wing outboard section relative horizontal plane
17a Centroidal axis of lower wing outboard section
18 Dihedral angle of upper wing relative to horizontal plane
18a Centroidal axis of upper wing
19 Outboard upper wing thrust producing unit
19a Outboard upper wing thrust producing unit rotor disc
19b Outboard upper wing thrust producing unit rotor blade
20 Outboard lower wing thrust producing unit
20a Outboard lower wing thrust producing unit rotor disc
20b Outboard lower wing thrust producing unit rotor blade
21 Inboard lower wing thrust producing unit
21a Inboard lower wing thrust producing unit rotor disc
21b Inboard lower wing thrust producing unit rotor blade
22 Container
23 Boarding area
24 Upper step in boarding area
25 Lower boarding step
26 Upper wing tip
27 Lower wing tip
28 Wheel-type main landing gear
29 Wheel-type nose landing gear
30 Rear thrust producing unit pod
31 Outboard upper wing thrust producing unit pod
32 Outboard lower wing thrust producing unit pod
33 Lower wing transition region thrust producing unit pod 34 Upper wing quarter chord line
35 Lower wing quarter chord line
36 Upper wing sweep angle
37 Lower wing sweep angle
38 Outboard lower wing extension
38a Outboard lower wing extension length
39 Forward flight direction
40 Thrust producing units assembly
41 Portside wing assembly
42 Starboard side wing assembly
43 Horizontal safety distance
44 Height

What is claimed is:

1. A multirotor aircraft that is adapted for vertical take-off and landing, comprising a fuselage, a tail boom that is provided with a vertical fin, a thrust producing units assembly that is provided for producing thrust in operation, at least one lower wing which comprises a lower wing inboard section that is connected to the fuselage and a lower wing outboard section that forms a lower wing tip, and at least one upper wing which is connected to the vertical fin and which forms an upper wing tip, wherein the at least one upper wing is joined to the at least one lower wing in a joined-wing configuration, wherein a first thrust producing unit of the thrust producing units assembly is non-tiltably mounted to the at least one upper wing and provided for generating lift at least during vertical taking-off and landing, the first thrust producing unit being arranged near a leading edge of the at least one upper wing, and wherein a second thrust producing unit of the thrust producing units assembly is non-tiltably mounted to the at least one lower wing and provided for generating lift at least during vertical taking-off and landing, the second thrust producing unit being arranged near a trailing edge of the at least one lower wing, wherein the at least one upper wing is downwardly inclined by a predetermined negative dihedral angle, and wherein the at least one upper wing comprises an upper wing inboard section that is connected to the vertical fin and an upper wing outboard section that forms the upper wing tip, wherein the upper wing outboard section is downwardly inclined by the predetermined negative dihedral angle relative to the upper wing inboard section.

2. The multirotor aircraft of claim 1,
wherein the at least one upper wing and the at least one lower wing are interconnected via an intermediate pylon to form the joined-wing configuration, wherein the intermediate pylon is mounted to the upper wing tip and to the lower wing outboard section near the lower wing tip.

3. The multirotor aircraft of claim 1,
wherein the at least one lower wing comprises a wing transition region that interconnects the lower wing inboard section and the lower wing outboard section, wherein at least one third thrust producing unit is non-tiltably mounted to the at least one lower wing near the trailing edge of the at least one lower wing and provided for generating lift at least during vertical taking-off and landing, the at least one third thrust producing unit being arranged near the wing transition region.

4. The multirotor aircraft of claim 3,
wherein a first wing pod is mounted to the upper wing tip for supporting the first thrust producing unit, wherein a second wing pod is mounted to the lower wing tip for supporting the second thrust producing unit, and wherein at least one third wing pod is mounted to the at least one lower wing in the wing transition region for supporting the at least one third thrust producing unit.

5. The multirotor aircraft of claim 1,
wherein the at least one lower wing is a rearward-swept wing, and wherein the at least one upper wing is a forward-swept wing.

6. The multirotor aircraft of claim 1,
wherein the lower wing outboard section is upwardly inclined by a predetermined positive dihedral angle relative to the lower wing inboard section.

7. The multirotor aircraft of claim 1,
wherein at least one additional thrust producing unit of the thrust producing units assembly is fixedly inclined with respect to a roll axis of the multirotor aircraft for generating forward thrust at least during cruise operation of the multirotor aircraft.

8. The multirotor aircraft of claim 7,
wherein the at least one additional thrust producing unit is non-tiltably mounted to the at least one upper wing and arranged near a trailing edge of the at least one upper wing.

9. The multirotor aircraft of claim 7,
wherein an additional wing pod is mounted to the upper wing for supporting the additional thrust producing unit.

10. The multirotor aircraft of claim 7,
wherein the at least one upper wing is at least approximately V-shaped.

11. The multirotor aircraft of claim 1,
wherein the lower wing inboard section and the lower wing outboard section delimit a boarding area of the multirotor aircraft.

12. The multirotor aircraft of claim 11,
wherein the boarding area is equipped with at least one boarding step that is adapted to support accessing of a cabin formed within the fuselage, wherein the at least one boarding step is arranged near a leading edge of the at least one lower wing, and wherein the first thrust producing unit defines an associated rotor disc in operation that is arranged at a predetermined safety distance from the at least one boarding step.

13. The multirotor aircraft of claim 1,
wherein the first thrust producing unit defines an associated rotor disc in operation that is arranged in height direction of the multirotor aircraft at least approximately at a height that corresponds to a respective cabin height, or above.

14. A multirotor aircraft that is adapted for vertical take-off and landing, comprising a fuselage, a tail boom that is provided with a vertical fin, a thrust producing units assembly that is provided for producing thrust in operation, at least one lower wing which comprises a lower wing inboard section that is connected to the fuselage and a lower wing outboard section that forms a lower wing tip, and at least one upper wing which is connected to the vertical fin and which forms an upper wing tip, wherein the at least one upper wing is joined to the at least one lower wing in a joined-wing configuration, wherein a first thrust producing unit of the thrust producing units assembly is non-tiltably mounted to the at least one upper wing and provided for generating lift at least during vertical taking-off and landing, the first thrust producing unit being arranged near a leading edge of the at least one upper wing, and wherein a second thrust producing unit of the thrust producing units assembly is non-tiltably mounted to the at least one lower wing and provided for generating lift at least during vertical taking-off and landing, the second thrust producing unit being arranged near a trailing edge of the at least one lower wing, wherein at least one additional thrust producing unit of the thrust producing units assembly is fixedly inclined with respect to a roll axis of the multirotor aircraft for generating forward thrust at least during cruise operation of the multirotor aircraft, wherein the at least one additional thrust producing unit is non-tiltably mounted to the at least one upper wing and arranged near a trailing edge of the at least one upper wing.

15. The multirotor aircraft of claim 14, wherein the at least one upper wing and the at least one lower wing are interconnected via an intermediate pylon to form the joined-wing configuration, wherein the intermediate pylon is mounted to the upper wing tip and to the lower wing outboard section near the lower wing tip, and wherein the at least one lower wing comprises a wing transition region that interconnects the lower wing inboard section and the lower wing outboard section, wherein at least one third thrust producing unit is non-tiltably mounted to the at least one lower wing near the trailing edge of the at least one lower wing and provided for generating lift at least during vertical taking-off and landing, the at least one third thrust producing unit being arranged near the wing transition region.

16. The multirotor aircraft of claim 15, wherein a first wing pod is mounted to the upper wing tip for supporting the first thrust producing unit, wherein a second wing pod is mounted to the lower wing tip for supporting the second thrust producing unit, and wherein at least one third wing pod is mounted to the at least one lower wing in the wing transition region for supporting the at least one third thrust producing unit, wherein the at least one lower wing is a rearward-swept wing, and wherein the at least one upper wing is a forward-swept wing, and wherein the lower wing outboard section is upwardly inclined by a predetermined positive dihedral angle relative to the lower wing inboard section.

17. A multirotor aircraft that is adapted for vertical take-off and landing, comprising a fuselage, a tail boom that is provided with a vertical fin, a thrust producing units assembly that is provided for producing thrust in operation, at least one lower wing which comprises a lower wing inboard section that is connected to the fuselage and a lower wing outboard section that forms a lower wing tip, and at least one upper wing which is connected to the vertical fin and which forms an upper wing tip, wherein the at least one upper wing is joined to the at least one lower wing in a joined-wing configuration, wherein a first thrust producing unit of the thrust producing units assembly is non-tiltably mounted to the at least one upper wing and provided for generating lift at least during vertical taking-off and landing, the first thrust producing unit being arranged near a leading edge of the at least one upper wing, and wherein a second thrust producing unit of the thrust producing units assembly is non-tiltably mounted to the at least one lower wing and provided for generating lift at least during vertical taking-off and landing, the second thrust producing unit being arranged near a trailing edge of the at least one lower wing, wherein the lower wing inboard section and the lower wing outboard section delimit a boarding area of the multirotor aircraft, and wherein the boarding area is equipped with at least one boarding step that is adapted to support accessing of a cabin formed within the fuselage, wherein the at least one boarding step is arranged near a leading edge of the at least one lower wing, and wherein the first thrust producing unit defines an associated rotor disc in operation that is arranged at a predetermined safety distance from the at least one boarding step.

18. The multirotor aircraft of claim 17, wherein the at least one upper wing and the at least one lower wing are interconnected via an intermediate pylon to form the joined-wing configuration, wherein the intermediate pylon is mounted to the upper wing tip and to the lower wing outboard section near the lower wing tip, wherein the at least one lower wing comprises a wing transition region that interconnects the lower wing inboard section and the lower wing outboard section, wherein at least one third thrust producing unit is non-tiltably mounted to the at least one lower wing near the trailing edge of the at least one lower wing and provided for generating lift at least during vertical taking-off and landing, the at least one third thrust producing unit being arranged near the wing transition region, and wherein a first wing pod is mounted to the upper wing tip for supporting the first thrust producing unit, wherein a second wing pod is mounted to the lower wing tip for supporting the second thrust producing unit, and wherein at least one third wing pod is mounted to the at least one lower wing in the wing transition region for supporting the at least one third thrust producing unit.

19. The multirotor aircraft of claim 17, wherein the at least one lower wing is a rearward-swept wing, and wherein the at least one upper wing is a forward-swept wing, and wherein the lower wing outboard section is upwardly inclined by a predetermined positive dihedral angle relative to the lower wing inboard section.

20. A multirotor aircraft that is adapted for vertical take-off and landing, comprising a fuselage, a tail boom that is provided with a vertical fin, a thrust producing units assembly that is provided for producing thrust in operation, at least one rearward swept lower wing which comprises a lower wing inboard section that is connected to the fuselage and a lower wing outboard section that forms a lower wing tip, and at least one forward-swept upper wing which is connected to the vertical fin and which forms an upper wing tip, wherein the at least one upper wing is joined to the at least one lower wing in a joined-wing configuration, wherein a first thrust producing unit of the thrust producing units assembly has a propeller with a vertical propeller rotational axis which is non-tiltably mounted to the at least one upper wing and provided for generating lift at least during vertical taking-off and landing, the first thrust producing unit being arranged near a leading edge of the at least one upper wing, and wherein a second thrust producing unit of the thrust producing units assembly has a propeller with a vertical propeller rotational axis which is non-tiltably mounted to the at least one lower wing and provided for generating lift at least during vertical taking-off and landing, the second thrust producing unit being arranged near a trailing edge of the at least one lower wing.

* * * * *